3,424,649
DIENE-MONOVINYLARENE BLOCK COPOLYMER-POLYOLEFIN LAMINATES
David D. Nyberg, San Pedro, and Willis R. Hendricks, Palos Verdes Estates, Calif., assignors to Shell Oil Company, New York, N.Y., a corporation of Delaware
No Drawing. Filed Sept. 24, 1965, Ser. No. 490,119
U.S. Cl. 161—253   3 Claims
Int. Cl. B32b 27/08; C08f 45/68

This invention is concerned with novel composite structures. More particularly, it is directed to composite structures comprising a substrate layer of a normally solid polyolefin tightly bonded to a superficial layer comprising certain elastomeric thermoplastic block copolymers combined with polyethylene.

Polyolefins such as polyethylene, polypropylene and thermoplastic copolymers thereof are utilized for diverse purposes in the formation of containers, structures, toys, film and the like. While they are highly useful for these purposes, they possess certain inherent shortcomings, particularly with respect to their extremely low coefficient of friction. While this inherent property may be useful in many instances, for other end uses it is a distinct disadvantage. A case in point is in the formation of boxes and other containers which may be referred to as "tote boxes." Such boxes are utilized for the harvesting and transportation of fruit and vegetables as well as in handling other articles of commerce and must meet a number of utilitarian requirements. For example, they must have adequate strength to be self-supporting, preferably capable of being stacked and, for efficiency purposes, must be capable of being transported by moving belt conveyors and the like. It is especially in the latter instance that the low coefficient of friction is especially disadvantageous. Moving belt conveyors are utilized for the purpose of transporting the tote boxes from trucks or other small conveyances onto larger automotive equipment or railway cars and, in reverse for the unloading of the same. If the containers passing along the conveyor belts have a low coefficient of friction, it is obvious that they will slip and slide, especially, on sloping surfaces. Moreover, when such containers are stacked and thereafter transported in moving vehicles, it is also obvious that they will be subject to slippage and falling if their surfaces in contact with each other have low coefficients of friction.

It is an object of the present invention to provide improved composite structures in the general area noted. It is a further object of the invention to provide substrate layers of polyolefins with a tightly adhered superficial layer of sharply increased coefficient of friction. Other specific objects will become apparent during the detailed description of this invention.

Now, in accordance with the present invention, composite structures are provided which comprise in intimate joined lamination a substrate surface of a normally solid polyolefin and tightly adhered thereto a superficial layer of a composition comprising 20–100 parts by weight of a thermoplastic polyolefin of at least one olefin having 2–3 carbon atoms per molecule and having a melt index between about 0.2 and 30 at 190° C.; and 100 parts by weight of an elastomeric block copolymer having the configuration:

poly(monovinyl arene) - poly(conjugated diene) - poly(monovinyl arene), wherein each poly(monovinyl arene) block has an average molecular weight between about 8,000 and 45,000; and the poly(conjugated diene) block has an average molecular weight between about 35,000 and 150,000. Still more preferably, the block copolymers combined with the polyolefin in forming the superficial layer has a melt index between about .4 and about 10.0 at 190° C. Specifically, a preferred composite structure comprises a substrate of polyethylene, especially in the form of sheet having tightly adhered thereto a superficial layer of a composition comprising 100 parts by weight of a block copolymer having the configuration:

polystyrene-polybutadiene-polystyrene combined with 25–75 parts by weight of polyethylene, the polyethylene having a density at 23° C. between about 0.85 and 0.93 and having a melt index at 190° C. between about 0.4 and 4.

The composite structures especially contemplated are therefore polyolefin sheet bearing a superficial layer of the two-component blend of block copolymers and a polyolefin. It has been found that the superficial layers when prepared from the materials just described meet three essential requirements:

(1) The superficial layer has a high coefficient of friction;

(2) The melt index of the blend is suitable for film formation by use of commercial film forming equipment; and (3) The blend bonds firmly to the polyolefin substrate.

In the structures of the present invention, if a rubbery material other than the thermoplastic self-vulcanizing block copolymers defined in the present specification are used, it is necessary to subject the composition to vulcanization after the lamination step. Of course, it is highly desirable to avoid such an additional step both for technical and economic reasons. Moreover, when the laminates are in contact with food materials, it is desirable to eliminate such substances as vulcanizing agents, accelerators and so on. Furthermore, if the block copolymers do not have the molecular weight ranges specified hereinafter, it has been found either extremely difficult or virtually impossible to form films of the superficial layer material, since the superficial layer composition should not contain plasticizing agents such as rubber extender oils and the like. The reason for excluding such oily materials will be apparent when consideration is given to the requirement for tight adherence of the superficial layer to the polyolefin substrate. Only when the superficial layer composition consists essentially of solid components and essentially no oil components is tight adherence achieved. Finally, if the superficial layer composition does not contain the required amount of polyolefin then a firm bond is not established between the superficial layer and the polyolefin substrate. Further advantages of the present composite structure lie in the unexpectedly high resistance to ozonolysis and oxidation of the block copolymer achieved by the combination with the polyolefin in the superficial layer composition. Furthermore, it has been found that the combination of polyolefin with the subject class of polycopolymers results in an essentially clear film. Hence, it is possible to print or decorate the polyolefin substrate and thereafter laminate thereto the superficial layer of block polymer-polyolefin, permitting the printing or decoration to show through this clear film. The printing or decoration is protected from abrasion or other wear by the superficial layer. Consequently, it will be seen that the composite structures of the present invention are subject to a multitude of uses where a high coefficient of friction is required and protection of printing or decoration is desirable.

The polyolefin substrates to which the skid resistant composition is laminated may be any of the commercially available polyolefins, such as polyethylene, polypropylene or thermoplastic ethylene-propylene copolymers or mixtures of the same. The shape and density of the substrate is not a material aspect of the present invention but sheets are especially contempalted which can be later formed into other shapes, such as boxes and the like. These sheets may be of any desired thickness depending upon their eventual use. For tote boxes normally employed in the harvesting and shipping of fruit and vegetables, sheet from 1/16 to 1/2 inch are particularly contemplated; however, substrates of thinner or thicker sheets may be employed for special purposes.

The superficial layer composition tightly adhered to the polyolefin substrate comprises 20–100 parts by weight of a thermoplastic polyolefin, otherwise referred to as a polymer of alpha olefins with 100 parts by weight of a block copolymer to be described more fully hereinafter.

The polyalkenes, e.g., polymers of alpha olefins, are those prepared by polymerization of alpha olefins having either 2 or 3 carbon atoms per molecule. These may be homopolymers, thermoplastic copolymers, including copolymers with 10–30% by weight of vinyl esters, e.g., copolymers of ethylene and vinyl acetate or high impact materials, sometimes referred to as "tail block" polyolefins. Broadly considered, the density of the polyolefin does not appear to be highly critical. Therefore, it is contemplated that the preferred class be those having densities measured at 23° C. between 0.85 and 0.97, the preferred density being in the order of 0.91 and 0.93. The polymers and particularly polyethylenes are still further defined by their melt index. Since the objective is to provide compositions having essentially the same stress-strain properties of the elastomeric block copolymers, it is preferred that the polyolefins have melt indices between about 0.2 and 4.0, since above about 30 the alpha olefin polymers are lower in molecular weight and, while providing improved processability to the compositions, do so at some expense to certain desirable physical properties. While this alteration in physical properties may be acceptable in many instances, it is especially contemplated in the present invention that the relatively higher molecular weight alpha olefin polymers having 0.3–2.0 melt indices be utilized.

The processes by which these alpha olefin polymers are prepared do not form a part of the present invention. They may be prepared by any of the well-known methods such as those described in the book "Polyethylene" by Raff and Allison, Interscience Publishers (1956). The density of the alpha olefin polymer is governed to a large extent by its method of manufacture but may be affected by after-treatment of the polymer such as by irradiation.

While polyethylenes are preferred in the compositions of this invention, polypropylenes may be utilized. Of course, combinations of several types of alpha olefin polymers may be employed. The use of polyethylenes for the unexpected and virtually unexplained improvement in the properties of the compositions referred to above may be enhanced by the additional presence of a polypropylene. The impact resistance of certain reasonably hard compositions may be improved by the use at least in part, of a high impact alpha olefin polymer.

Where, in the present specification and claims, reference is made to the density of polyolefins, this is based upon A.S.T.M. specification D–1505, expressed in grams per cc. determined at 23° C. The melt index references contained in the specification refer to determinations made in accordance with A.S.T.M. specification D–1238–57T, condition E for polyethylene, determined at 190° C., and according to A.S.T.M. specification D–1238–52T, for polypropylene.

The elastomeric block copolymers to be combined with the alpha olefin polymers in accordance with this invention have the general configuration:

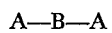

A—B—A wherein each A is an independently selected polymer block of a monovinyl arene hydrocarbon, the average molecular weight of each block A being between about 8,000 and 45,000, B is a polymer block of a conjugated diene, the average molecular weight of the block being between about 35,000 and 150,000, and the weight of the blocks A together being less than about 38% of the total weight of the block copolymer.

While block copolymers having a broader range of average molecular weights in the individual blocks may be prepared and utilized, the types referred to above insofar as their average molecular weights are concerned are those in which the maximum and optimum combination of desirable physical properties is found. Where in the present invention reference is made to average molecular weights of the block copolymers, this will be understood to refer to average molecular weights determined preferably by intrinsic viscosity measurements as they are related graphically to osmotic molecular weights. These are closely coordinated with molecular weights obtained by analysis of end group-tritiated samples of the polymer, the samples being withdrawn and treated with tritiated methanol at any given stage in the polymerization process as desired. For example, the molecular weights of the polyvinyl arene blocks may be determined by withdrawal of a sample at the end of the step in the process in block polymerization forming the first polyvinyl arene block, the lithium terminated polymer block being treated with tritiated methanol, whereby the lithium radical is replaced with tritium and thereafter counting the tritium preferably in a scintillation counter.

The elastomeric center block may be prepared from conjugated dienes such as isoprene, butadiene and the like although isoprene and butadiene are preferred. The non-elastomeric end blocks of monovinyl arene hydrocarbons comprise especially styrene, vinyl toluene, and vinyl xylene although styrene is preferred. Thus, the preferred species comprise polystyrene-polybutadiene-polystyrene and polystyrene-polyisoprene-polystyrene.

Block copolymers containing less vinyl or 1,2 addition configuration consistent with the production of economically low cost polymers are prepared by the use of lithium-base initiators which are capable of being utilized in non-polar media, since it has been found that the utilization of certain other lithium based initiators require the use of polar compounds such as ethers and the like to permit satisfactory polymerization. The presence of even a small amount of ether in the reaction mixture, however, promotes the formation of center blocks having a substantially increased vinyl content strongly affecting the properties of the products so obtained. Therefore, the lithium-based catalysts useful for this purpose, when a low vinyl structure is of paramount importance, include lithium metal, alkyl lithiums and certain other lithium compounds described in the literature and known to experts in the art. Alkyl lithium compounds are preferred, particularly those having up to 8 carbon atoms per molecular including butyl lithiums, amyl lithiums and their homologues. In order to promote the low vinyl content, inert hydrocarbon solvents are preferred, such as alpha-olefins or lower alkanes, although certain aromatic hydrocarbons such as benzene and the like may be utilized. Cycloaliphatic hydrocarbons such as cyclohexane and their mixture with aromatics, e.g., benzene, may be employed.

As stated hereinbefore, the product of this invention possesses the unique characteristic of being "self-curing," by which is meant that the product assumes the properties of a vulcanized elastomer without chemical cross-linking. Consequently, they may be used directly after their formation without vulcanization. Because of this, they are potentially capable of being shaped in high speed molding and extruding apparatus, such as film extrusion and the like. This is only true in the present instance since the proportion of terminal groups to center groups and the average molecular weight of each of the groups has been carefully designed to promote both the properties necessary for extrusion purposes and those necessary for self-vulcanized elastomeric polymers.

The elastomers of this invention may be compounded with the usual rubber compounding materials such as pigments (e.g., carbon blacks, titanium dioxide, etc.).

The compositions from which the superficial layer is prepared may be compounded on a mill or may be solution blended as desired. The superficial layer may be deposited upon the polyolefin substrate either in the form of a solution from which the solvent will then be evaporated or it may be heat bonded to the substrate in the form of a preformed film. The composite structure then may be cut, vacuum formed, or otherwise utilized so as to capitalize upon the high coefficient of friction of the tightly adhering superficial layer deposited on the surface of the polyolefin substrate.

Another end use of the structures of the present invention is that of a laminate film, one layer of the laminate being a film of polyolefin, while the other layer of a laminate may be the block polymer-polyolefin composition. Any number of such alternating layers may be utilized, for example, a film of a polyolefin may be coated on either one or both sides with the composition having the high coefficient of friction if this is desired. Of course, in addition to having the properties outlined herewith, the superficial layer also has substantial elasticity and possesses the stress-strain properties of a vulcanized rubber, although it has not, in fact, been vulcanized.

The following examples illustrate the preferred form of the present invention.

EXAMPLE I

Low density polyethylene having a density of about 0.92 and a melt index of about 1.0 was combined by milling with two block copolymers, both of them having the structures polystyrene-polybutadiene-polystyrene, one of them having block molecular weights of 14,000-62,000-14,000, while the other had block molecular weights of 8800-41,000-8800. 37.5 parts by weight of each of the block polymers was combined with 25 parts by weight of the polyethylene. A film prepared from this composition was laminated to a sheet of ⅛ inch thickness high density polyethylene to achieve a firm bond and a surface with a high coefficient of friction.

EXAMPLE II

A blend was prepared of equal parts of an ethylene-vinyl acetate copolymer containing 20% by weight of vinyl acetate and the block copolymer being polystyrene-polybutadiene-polystyrene. A sheet of this blend was heat-bonded under pressure to a polyethylene sheet, the conditions being 120° C. for 10 minutes at about 30 p.s.i. A strong bond was formed between the polyethylene and the blend. Attempts were made to bond the unmodified block copolymer to polyethylene sheet, but unsatisfactory results were obtained, the bond being subject to easy rupture by hand pulling.

EXAMPLE III

The block copolymer blend with ethylene-vinyl acetate copolymer was dissolved in toluene to form a 25% solution which was painted on polyethylene sheet. The solvent was allowed to evaporate and it was found that a tightly bonded laminate was so formed.

We claim as our invention:

1. A composite structure which comprises, in intimate joined lamination
   (a) a substrate layer of a normally solid polyolefin, and
   (b) a tightly adhered superfical layer of a composition comprising:
      (1) 20–100 parts by weight of a thermoplastic polyolefin of at least one olefin having 2–3 carbon atoms per molecule and having a melt index at 190° C. between about 0.2 and 0.4; and
      (2) 100 parts be weight of an elastomeric block copolymer having the configuration:
         poly(monovinylarene)-poly(conjugated diene)-poly(monovinylarene)
      wherein each poly(monovinylarene) block has an average molecular weight between about 8000 and 45,000; and the poly(conjugated diene) block has an average molecular weight between about 35,000 and 150,000.

2. A composite structure according to claim 1 wherein the substrate layer is polyethylene.

3. A composite structure according to claim 1 wherein the block copolymer has the configuration polystyrene-polybutadiene-polystyrene and the polyethylene combined therewith is present in an amount between about 25 and 75 parts by weight, has a density at 23° C. between about 0.85 and 0.93 and a melt index at 190° C. between about 0.3 and 2.0.

References Cited

UNITED STATES PATENTS 3,239,478  3/1966  Harlan _____ 260—876
3,242,038  3/1966  Dallas et al. _____ 161—253

JACOB H. STEINBERG, *Primary Examiner.*

WILLIAM J. VAN BALEN, *Assistant Examiner.*

U.S. Cl. X.R.

260—876; 156—334; 117—138.8; 229—6